Jan. 4, 1966 J. W. BROUILLETTE, JR., ET AL 3,227,972

APPARATUS IN WHICH PHONON ENERGY IS EFFICIENTLY GENERATED BY MAGNETOSTRICTIVE EFFECTS

Filed April 17, 1964

INVENTORS:
JOSEPH W. BROUILLETTE, JR.
HSIUNG HSU,
STEPHEN WANUGA,
BY Marvin L. Goldenberg
THEIR ATTORNEY.

United States Patent Office 3,227,972

Patented Jan. 4, 1966

3,227,972

APPARATUS IN WHICH PHONON ENERGY IS EFFICIENTLY GENERATED BY MAGNETOSTRICTIVE EFFECTS

Joseph W. Brouillette, Jr., Jamesville, N.Y., Hsiung Hsu, Columbus, Ohio, and Stephen Wanuga, Liverpool, N.Y., assignors to General Electric Company, a corporation of New York Filed Apr. 17, 1964, Ser. No. 360,662
13 Claims. (Cl. 333—30)

The present invention relates to apparatus providing excitation of phonon energy within a transducer by magnetostrictive effects, and more particularly, to novel and improved devices of this type wherein the efficiency of excitation is appreciably improved by enhancing the magnetic field coupled to the transducer. With still further particularity, the invention relates to novel wide-band and narrow-band high frequency structures useful, for example, as microwave delay lines as well as for other applications, which provide for the efficient excitation of phonon energy by magnetostrictive effects. (In the context used, high frequency structures refer to coaxial lines, waveguides, cavity structures, etc., which are characterized by distributed capacitances and inductances.)

The excitation of phonon or acoustical energy by magnetostrictive effects using high frequency cavity structures has been achieved with some degree of success in the prior art. An article describing early work in this field was published in the Physical Review Letters of July 15, 1959, vol. 3, No. 2, entitled, "Excitation of Hypersonic Waves by Ferromagnetic Resonance," by Bömmel and Dransfeld.

Since the wavelength and velocity of propagation properties of acoustical energy are many orders of magnitude less than corresponding parameters of electromagnetic energy of the same frequency, there are many recognized advantages to be derived from the generation of acoustical energy, which apply over a wide range of frequencies. Improved delay line and storage devices may be built since their dimensions can be reduced by orders of magnitude over that required for conventional electromagnetic energy devices. Also, phonon excitation and propagation offers improved parametric amplification possibilities because of the increased number of interactions possible within a given propagating distance.

In the developments in this area to date, however, the above noted advantages stemming from the utilization of phonon waves have been largely offset by extremely low coupling efficiencies. At the present time insertion losses on the order of 80 to 100 db are typical for coupling between electromagnetic energy and acoustical energy in the microwave frequency range. The present invention provides novel structure in which these insertion losses are appreciably reduced.

It is accordingly a primary object of the present invention to provide novel high frequency apparatus in which phonon energy is generated by magnetostrictive effects with a degree of efficiency appreciably higher than heretofore possible using techniques known to the prior art.

It is another object of the present invention to provide novel high frequency apparatus in which phonon energy is generated by magnetostrictive effects with a relatively high degree of efficiency by enhancement of the applied RF magnetic field.

It is a further object of the present invention to provide novel high frequency cavity structures in combination with a phonon wave propagating member having a thin film layer of magnetostrictive material bonded to at least one end surface thereof in which phonon energy is efficiently generated using magnetostrictive effects.

It is another object of the present invention to provide novel high frequency wide-band structures in combination with a phonon wave propagating member having a thin film layer of magnetostrictive material bonded to at least one end surface thereof in which phonon energy is efficiently generated using magnetostrictive effects.

It is a further, more specific, object of the present invention to provide a novel high frequency wide-band delay line which employs for the delay medium a phonon wave propagating member having a thin film layer of magnetostrictive material bonded to at least one end surface thereof and which provides a relatively efficient excitation of the phonon energy within said thin film layer for propagation through said member.

These and other objects of the invention are accomplished in one embodiment of the invention in a high frequency structure which includes a re-entrant cavity having electromagnetic energy introduced thereto, the RF magnetic field of said energy being a maximum in the region surrounding the base of the cavity center post. A member, typically cylindrical in configuration, composed of material which efficiently propagates hypersonic energy and having a thin film layer of magnetostrictive material bonded to at least one end face thereof is inserted into the re-entrant cavity. The magnetostrictive material is provided with a D.C. magnetization oriented in a given direction, which is typically along the direction of the thickness of said thin film layer. Insertion of the cylindrical member is made in the region of maximum RF magnetic field so that the field is coupled into the thin film layer, being oriented in the plane of said layer and orthogonal to the indicated D.C. magnetization. The combined RF magnetic field and D.C. magnetization act to excite phonon energy within the thin film. In accordance with the invention, the periphery, or the surface area, of the center post at the base region is reduced for increasing the RF magnetic field density coupled to the thin film. In this manner phonon energy is excited in the magnetostrictive layer with improved coupling efficiency, the energy being readily coupled through the interface to the principal portion of the acoustical energy propagating member.

In accordance wtih a second embodiment of the invention, there is provided a high frequency wide-band structure comprising a first and second strip transmission line for propagating electromagnetic energy, each having two parallel ground plates and a center conductor. The transmission lines are abutted along their length so that a common ground plate is employed for the two lines. Inserted between the two transmission lines in an opening provided in said common ground plate is a member, typically rod shaped, composed of material which efficiently propagates hypersonic energy and having a thin film layer of magnetostrictive material deposited on each end face. In the regions where the rod member is inserted, the center conductors of two transmission lines each have a segment in which their periphery is reduced, as to a fine wire. The reduction in circumference increases the RF magnetic field density surrounding the conductor. The thin film layers are positioned in proximity to the reduced dimensioned center conductor segments within said first and second transmission lines, respectively, so that the RF magnetic field coupled to the thin film layers is oriented in the plane of said layers and typically orthogonal to a D.C. magnetization provided to said layers. Accordingly, electromagnetic energy introduced into and propagated by the first transmission line is coupled to phonon energy in the associated thin film layer, said phonon energy being propagated through the rod member to the opposing surface thin film layer. The phonon energy is then converted back into electromagnetic energy and propagated in said second transmission line. The propagation of the phonon energy through the rod member provides an appreciable time delay of an applied signal.

While the specification concludes with claims particularly pointing out and distinctly claiming the invention, it is believed that the invention will be better understood from the following description taken in connection with the accompanying drawings in which:

Figure 1:
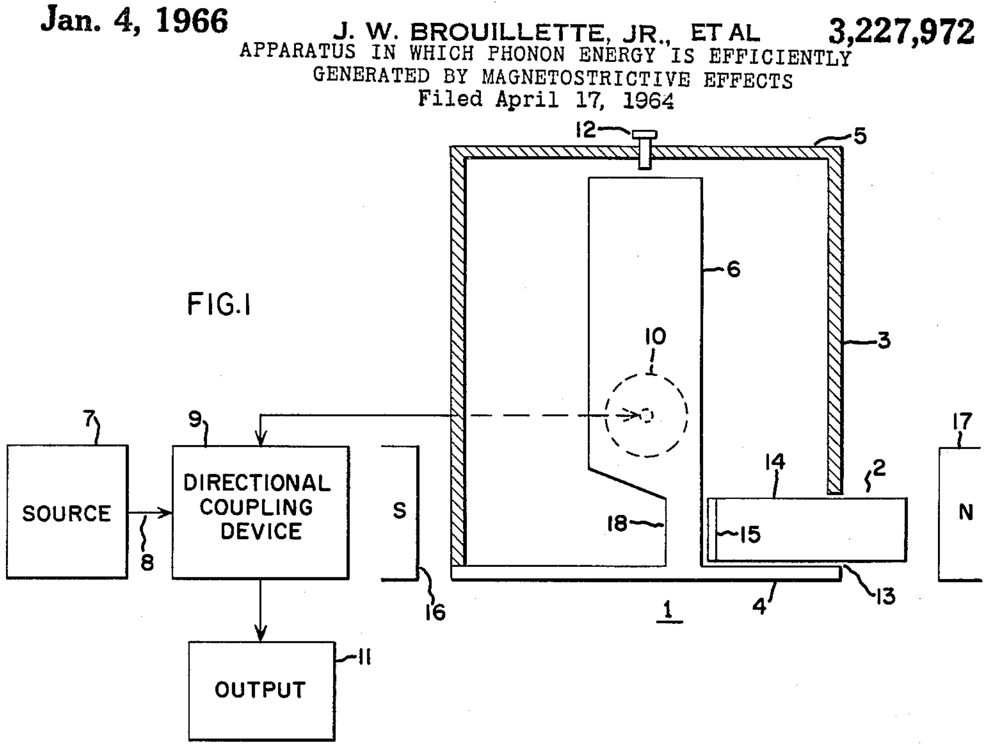
FIGURE 1 is a schematic illustration in accordance with one embodiment of the invention, of a cavity structure in which phonon energy is excited by magnetostrictive effects.

Referring now to FIGURE 1, there is schematically illustrated a cavity structure 1 in which high frequency electromagnetic energy introduced into the cavity chamber is efficiently coupled to phonon energy within a phonon energy propagating member 2 inserted into the cavity. The illustrated device has immediate utility as a high frequency, narrow band delay line. However, the basic novel structure taught will have application to numerous other devices in which phonon energy is generated and propagated. The cavity structure 1 is of the re-entrant type and is typically in the form of a closed cylinder including a cylindrical outer wall 3 and circularly shaped bottom and top end plates 4 and 5. There is further included a central post structure 6. It may be noted that the configuration of the cavity structure may as well be of other conventional types, such as rectangular or cubical constructions.

Electromagnetic energy from a source 7 is coupled by conventional means, shown by line 8, through a directional coupling device 9 to a suitable connector 10, and is introduced into the cavity chamber. The device 9 is also coupled to an output 11. In accordance with standard practice, the electromagnetic energy may be either capacitively, inductively or radiantly coupled into the cavity chamber. As is well known, in cavity structures of the type illustrated, the length of the center post is approximately equal to an integral odd number of quarter wavelengths of the electromagnetic energy, the bottom plate 4 being an electrical short circuit and the top portion of the cavity being an approximate electrical open circuit. A tuning stub 12, which can be a metal screw, or other means useful for field perturbation, is inserted into the top end plate 5 for tuning the cavity. The electromagnetic energy introduced into the cavity is contained in an electric field extending radially out from the center post 6 to the cylindrical wall 3, and a magnetic field extending at right angles to the electric field and oriented concentrically around the post 6. Within the cavity, the magnetic field is maximum in the vicinity of the bottom end plate 4 and minimum in the vicinity of the top end plate 5.

The member 2 is inserted through an aperture 13 in the outer wall 3 extending into the cavity chamber in the region of maximum RF magnetic field. The member 2, which is typically in the form of a rod, has a principal central region 14 composed of a material which efficiently propagates hypersonic energy. Deposited on the inserted end surface of member 2 is a thin film transducer 15 of magnetostrictive material. The central region 14 of member 2 is typically a single crystal material, e.g., quartz or sapphire. The thin film layer 15 can be composed of a number of different types of polycrystalline magnetostrictive materials such as nickel or an alloy of nickel, for example, a nickel cobalt alloy or a nickel iron alloy. The thin film layer can be deposited by various techniques well known in the art, such as evaporating or electroplating. For effective phonon excitation, the thickness dimension of the thin film layer 15 should be on the order of one-half the wavelength, within the thin film layer, of the acoustical energy to be excited.

A D.C. magnetization is provided in a direction generally parallel to the longitudinal axis of the member 2 and orthogonal to the plane of the thin film layer 15. The indicated orientation of the D.C. magnetization provides excitation of primarily a single shear mode of phonon energy. In accordance with physical principles known in the art, the orientation and strength of the D.C. magnetization can be varied for providing coupling to other phonon energy modes, i.e., a second shear mode and the longitudinal mode. The D.C. magnetization is readily generated by external magnetizing means such as magnetic pole shoes 16 and 17. Alternatively, the magnetostrictive layer 15 may be provided with a remanent D.C. magnetization so that external magnetizing means are not required. Whether an external D.C. magnetic field is necessary is largely a function of the magnetostrictive material used.

The center post 6 is undercut at its base region, as shown at the region 18. The tapered transition between the uncut region and the undercut region 18 is for impedance matching purposes. It is not critical if the cut taken is asymmetrical, as shown, or symmetrical. What is significant is that the circumference of the center post is reduced so as to increase the current at this portion of the post. Accordingly, the RF magnetic field density close in to the undercut region 18 is made greater, thereby increasing the density of the RF magnetic field that is coupled to the thin film layer 15. Although undercutting of the center post somewhat reduces the Q of the cavity, the resulting increased RF magnetic field density coupled to the magnetostrictive film more than compensates for the Q reduction. The length of the cut should be preferably on the order of the diameter of the member 2 so that the magnetic field is coupled to the magnetostrictive film with maximum efficiency and so that the Q is reduced no greater than is necessary. Further, in order to not excessively reduce the Q, the length of the cut portion should be no greater than about one-fourth of the overall center post length.

The greater the constriction in the center post radial dimension, the greater the enhancement of the magnetic field. However, certain limitations are introduced in extreme reductions of the radial dimension of region 18, and therefore trade-offs must be made in accordance with a desired operation. Thus, an extremely small surface area at the undercut portion produces large eddy current losses. Conventional techniques, such as silver plating the cavity surfaces, may be employed to reduce these losses. Further, the RF magnetic field surrounding the region 18 becomes concentrated extremely close in to the structure so that coupling of the field to the magnetostrictive layer 15 may be reduced. Finally, for extremely small dimensions of region 18, such as reduction to a fine wire, additional supporting structure for the center post 6 is required.

Considering a given operation of the device of FIGURE 1, with electromagnetic energy introduced into the cavity 1, an RF magnetic field is coupled to and extends through the thin film layer 15 in a direction within the plane of said thin film which, in this case, is orthogonal to the established D.C. bias magnetization. This is most clearly shown in FIGURE 2 which is an end view of member 2 indicating the field lines therein. The RF magnetic field, shown by field lines F to be parallel to the plane of the paper, in combination with the D.C. bias magnetization, indicated by a circled dot as coming out from the plane of the paper, produce a physical deformation of the film layer 15 in a manner such as to primarily excite one of two orthogonally disposed shear modes of hypersonic energy. The particular shear mode excited is determined principally by the characteristics of the magnetostrictive material, and the orientation of the RF magnetic field and the D.C. magnetization within said thin film layer. Characteristic of a shear mode, particle motion of the phonon energy is in the transverse or shear direction, which is essentially in the plane of the film, with wave motion in the longitudinal direction. Accordingly, the excited shear mode is readily coupled to and propagated through the central region 14 of the member 2. At the opposite end surface of the region 14, the wave is reflected back through the member 2 and is transduced again into electromagnetic energy within the cavity chamber. The electromagnetic energy is readily coupled out of the cavity and directed by directional coupling device 9 into output 11.

It is noted that two such cavity structures as shown in FIGURE 1 can be employed together, one as an input cavity and the other the output cavity. In this construction both end faces of member 2 are coated with a magnetostrictive thin film, one inserted into the input cavity and the other into the output cavity in the manner taught. The directional coupling device is then not required.

Figures 2, 3:
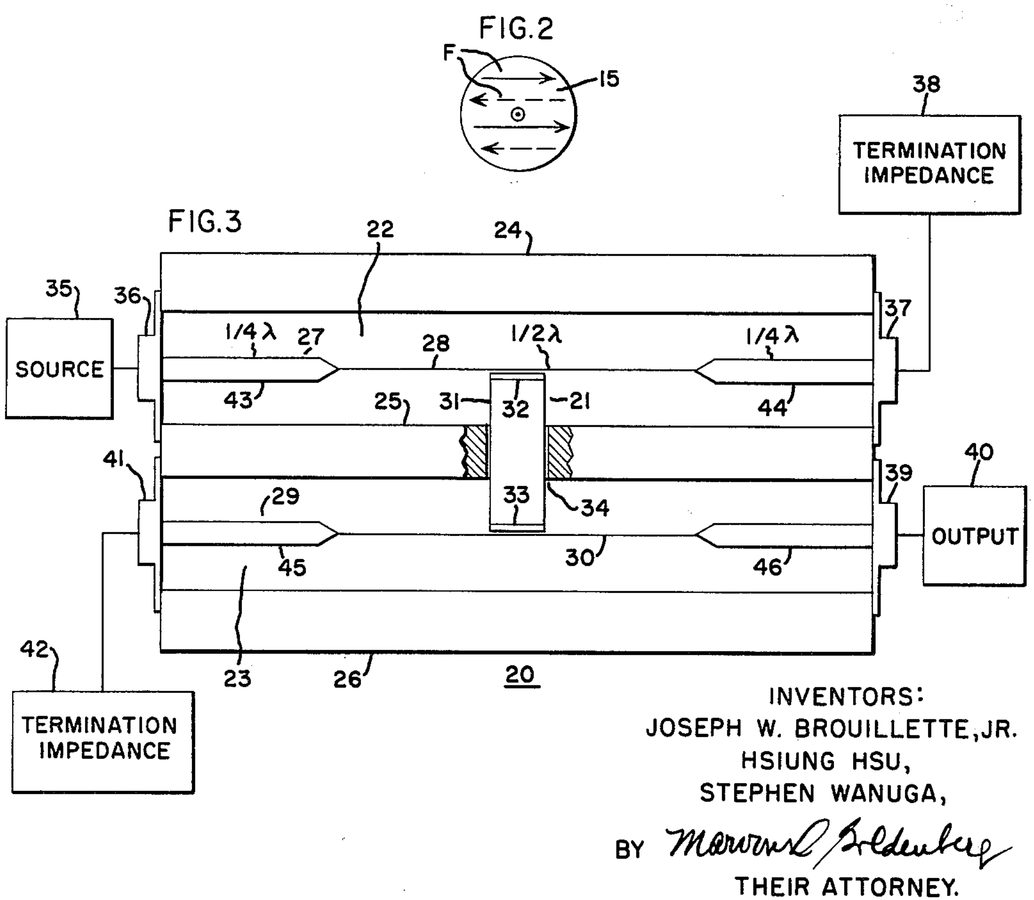
FIGURE 2 is an end view of the phonon energy propagating member of FIGURE 1 showing the D.C. magnetization and RF magnetic field lines therein.
FIGURE 3 is a schematic illustration, in accordance with a second embodiment of the invention, of a high frequency wide-band delay line structure in which phonon energy is excited by magnetostrictive effects.

Referring now to FIGURE 3, there is illustrated a schematic diagram of a second embodiment of the invention, a high frequency wide-band transmission line structure 20 in the form of a delay line. In the structure 20, electromagnetic energy is converted into hypersonic energy, propagated as such through a delay member 21 and converted back into electromagnetic energy. The delay line structure 20 includes an input and an output strip transmission line 22 and 23 contiguously arranged, having a first ground plate 24, a center ground plate 25 common to both lines, and a third ground plate 26. Transmission line 22 includes a center conductor 27 having a segment 28 of reduced circumference, and transmission line 23 includes a center conductor 29 having a segment 30 of reduced circumference. For example, in one constructed embodiment the center conductors were normally .025 in. by .075 in., and the reduced segments were fine wires with a diameter of about .002 in. Delay member 21 is provided having properties similar to member 2 of FIGURE 1, but with both end faces coated. Thus, member 21 has a central region 31 composed of material which efficiently propagates hypersonic energy, with each end thereof coated with thin film layers 32 and 33 of magnetostrictive material. Member 21 is inserted between transmission lines 22 and 23 in an aperture 34 provided in common ground plate 25, so that the thin film layers 32 and 33 are in close proximity or actual contact with center conductor segments 28 and 30, respectively.

A source of microwave electromagnetic energy 35 is coupled by an input connector 36 of conventional type, schematically illustrated, to one end of center conductor 27, the other end thereof being coupled by connector 37 to a terminating impedance 38. Correspondingly, one end of center conductor 29 is coupled by output connector 39 to an output 40, and the other end thereof is coupled by connector 41 to a terminating impedance 42. Terminating impedances 38 and 42 are provided for minimizing reflections.

The impedance of the transmission lines 22 and 23 is determined and controlled by the spacing between the ground plates and the size and shape of the center conductors. The relative electrical lengths of the reduced dimensioned segments 28 and 30 and the unreduced segments 43, 44, 45 and 46 of the center conductors 27 and 29 are adjusted so as to provide an impedance match between said reduced dimensioned segments and source 35, output 40 and terminating impedances 38 and 42. The indicated impedance matching provides the structure 20 with good wide-band characteristics. Contributing to the impedance match, the unreduced center conductor segments 43 to 46 have each an electrical length of an odd multiple of quarter wavelengths at the center frequency of operation $f_c$. The electrical length of segments 28 and 30 is an integral number of half wavelengths at the same frequency. For most efficient impedance matching and smallest losses, the unreduced segments are each one-quarter wavelength and the reduced segments are each one-half wavelength, as shown in FIGURE 3. Alternatively, the matching frequencies for the unreduced and reduced segments can be offset so as to achieve even wider overall bandwidth operation. For example, the half wavelength dimension is at $f_1$, where $f_1 < f_c$, and the quarter wavelength dimension is at $f_2$, where $f_2 > f_c$.

In the operation of the device of FIGURE 3, high frequency electromagnetic energy introduced into transmission line 22 is propagated between center conductor 27 and ground plates 24 and 25. In a comparable manner to that described with respect to FIGURE 1, this energy establishes an enhanced RF magnetic field in the region of thin film layer 32, which field is coupled into the plane of thin film layer 32 in a direction orthogonally disposed with respect to a permanent D.C. magnetization established within thin film layers 32 and 33 by means not shown. The combined effects of the RF magnetic field and the D.C. magnetization physically deform the thin film layer 32 so as to excite a shear mode of phonon energy which is propagated through the member 21 to the opposite thin film layer 33. The phonon energy is then converted back into electromagnetic energy, conducted through the transmission line 23 between center conductor 28 and ground plates 25 and 26, and is finally coupled to output 40. Since the velocity and propagation of phonon energy is extremely low relative to that for electromagnetic energy, the delay provided by member 21 may be appreciated to be very long.

In one operable embodiment of the invention employing an RF pulse generator source of 50 ohms internal impedance working over a frequency range of 1 to 2 k.m.c., approximately a four microsecond delay was obtained with a delay member 2 cm. in length.

Although the invention has been described with respect to specific embodiments thereof, it is not intended to be so limited. Accordingly, it may be appreciated that the basic teachings provided herein may be readily extended by one skilled in the art to modified structures which fall within the invention. For example, the wide-band delay line of FIGURE 3 has been constructed to have a common ground plate between the two transmission lines primarily for ease of construction, but may alternatively be composed of two separate, adjacently mounted strip transmission lines. A transmission line well known to the art and having a single ground plate and a parallel disposed, spaced apart conductor can also be employed in a strip line configuration of the invention. Further a wide-band delay line employing coaxial transmission lines in lieu of the disclosed strip transmission lines may be readily constructed, said coaxial line version being the electrical equivalent of the strip line. Similar impedance matching properties may be designed into a coaxial line embodiment as has been described as with respect to the strip transmission line. It may also be appreciated that a single transmission line can be employed with a directional coupling device separating input from output, as in the illustrated cavity embodiment.

The above, as well as other modifications which fall within the true scope and spirit of the invention, are intended to be included within the appended claims.

What we claim as new and desire to secure by Letters Patent of the United States is:

1. Apparatus for providing efficient coupling between

RF electromagnetic energy and phonon energy by magnetostrictive effects comprising:
(a) means for supporting said RF electromagnetic energy having a first conductor and a second conductor spaced therefrom, said electromagnetic energy exhibiting an RF electric field extending between said conductors and an RF magnetic field extending around said first conductor,
(b) said first conductor having a region of reduced surface area for increasing the density of the RF magnetic field around said region,
(c) a thin film magnetostrictive medium having a D.C. magnetization oriented in a predetermined direction, said medium being positioned proximate to said reduced surface area region so that the increased density field is coupled through said medium in a direction approximately parallel to the plane of the principal surface thereof for providing efficient coupling between said RF electromagnetic energy and phonon energy supported by said thin film medium.

2. Apparatus as in claim 1 wherein said thin film magnetostrictive medium is bonded to a phonon energy propagating member in a manner so as to provide efficient transfer of said phonon energy between said medium and said member.

3. Apparatus for providing efficient coupling between RF electromagnetic energy and phonon energy by magnetostrictive effects comprising:
(a) a re-entrant type cavity structure for supporting said RF electromagnetic energy having a center post and a concentrically arranged outer wall enclosure, said electromagnetic energy exhibiting an RF electric field extending between said center post and outer wall enclosure and an RF magnetic field surrounding said center post which magnetic field is a maximum in the vicinity of the base region of said center post,
(b) said base region having its periphery reduced with respect to the remaining center post periphery for increasing the density of the RF magnetic field surrounding said region,
(c) a thin film magnetostrictive medium provided with a D.C. magnetization oriented in a given direction, said medium being positioned proximate to said base region with its principal surface tangentially disposed with respect to the increased density RF magnetic field so that said increased density field is coupled through said medium in a direction approximately parallel to the plane of said principal surface, whereby efficient coupling occurs between said RF electromagnetic energy and phonon energy supported by said thin film medium.

4. Apparatus as in claim 3 wherein said thin film magnetostrictive medium is bonded to a phonon energy propagating member in a manner so as to provide efficient transfer of said phonon energy between said medium and said member.

5. Apparatus as in claim 4 wherein the length of said base region is no greater than about one fourth the center post length so as not to cause excessive losses with said cavity structure.

6. Apparatus as in claim 4 wherein said D.C. magnetization is oriented in a direction approximately orthogonal to said principal surface of said magnetostrictive medium for selecting primarily a single shear mode to be coupled with said RF electromagnetic energy.

7. Apparatus for providing efficient coupling between RF electromagnetic energy and phonon energy by magnetostrictive effects comprising:
(a) a transmission line structure for supporting said RF electromagnetic energy, said structure including a first and second transmission line each having a first conductor and a second conductor spaced therefrom, said electromagnetic energy exhibiting an RF electric field extending between said conductors and an RF magnetic field around the first conductors of said first and second transmission lines,
(b) said first conductors each having a region of reduced periphery for increasing the density of the RF magnetic field around said regions,
(c) a phonon energy propagating member having a thin film magnetostrictive medium bonded to each end face thereof, the magnetostrictive media being provided with a D.C. magnetization oriented in a given direction, said member being coupled between said first and second transmission lines with the thin film of one end face positioned proximate to the reduced periphery region of the first transmission line and the thin film of the other end face positioned proximate to the reduced periphery region of the second transmission line, so that the increased density RF magnetic field is coupled through said media in a direction approximately parallel to the plane of the principal surface of said media for providing efficient coupling between said RF electromagnetic energy and said phonon energy.

8. A high frequency, narrow-band delay line comprising:
(a) a re-entrant type cavity structure having a center post and a concentrically arranged outer wall enclosure,
(b) directional coupling means for coupling RF electromagnetic energy to and from said cavity structure, said electromagnetic energy exhibiting an RF electric field extending between said center post and said outer wall enclosure and an RF magnetic field surrounding said center post which magnetic field is a maximum in the vicinity of the base region of said center post,
(c) said base region having a reduced periphery relative to the remaining center post periphery for increasing the density of the RF magnetic field surrounding said region,
(d) a phonon energy propagating member inserted into said cavity structure, said member having a thin film magnetostrictive medium bonded to an end face thereof, said medium being provided with a D.C. magnetization oriented in a given direction and positioned proximate to said base region with its principal surface tangentially disposed with respect to the increased density RF magnetic field so that said increased density magnetic field is coupled through said medium in a direction approximately parallel to the plane of said principal surface, whereby RF electromagnetic energy introduced into said cavity structure efficiently excites phonon energy in said thin film medium, said phonon energy upon propagating through said member being efficiently coupled back into RF electromagnetic energy that is extracted from said cavity structure with an appreciable time delay.

9. A delay line as in claim 8 wherein the length of said base region is no greater than about one-fourth the center post length so as not to cause excessive losses with said cavity structure.

10. A delay line as in claim 8 wherein said D.C. magnetization is oriented in a direction approximately orthogonal to said principal surface of said magnetostrictive medium for selecting primarily a single shear mode to be coupled with said RF electromagnetic energy.

11. A high frequency, wide-band delay line comprising:
(a) a transmission line structure including a first and second transmission line each having a pair of spaced ground plates with a center conductor disposed therebetween,
(b) input means for coupling RF electromagnetic energy to an end terminal of said first transmission line, (c) output means for coupling electromagnetic energy from an end terminal of said second transmission line, the RF electromagnetic energy propagating through said transmission lines exhibiting an RF electric field extending between said center conductors and their associated ground plates and an RF magnetic field encircling said center conductors, (d) said center conductors each having a region of reduced periphery for increasing the density of the RF magnetic field surrounding said regions, (e) a phonon energy propagating member having a thin film magnetostrictive medium bonded to each end face thereof, the magnetostrictive media being provided with a D.C. magnetization oriented in a given direction, said member being coupled between said first and second transmission lines with the thin film medium of one end face positioned proximate to the reduced periphery region of the first transmission line and the thin film medium of the other end face positioned proximate to the reduced periphery region of the second transmission line so that the increased density magnetic field is coupled through said media in a direction approximately parallel to the plane of the principal surface of said media, whereby RF electromagnetic energy coupled to said first transmission line efficiently excites phonon energy in the thin film medium of said one end face, said phonon energy upon propagating through said member being efficiently coupled from the thin film medium of said other end face to RF electromagnetic energy in said second transmission line, said RF electromagnetic energy being extracted from said second transmission line with an appreciable time delay.

12. A high frequency, wide-band delay line as in claim 11 wherein terminating impedances are coupled to the remaining two end terminals of said first and second transmission lines, the electrical length of the reduced periphery regions is about one-half wavelength at a given frequency displaced to one side of center frequency and the portions of the center conductors coupling said reduced periphery regions to the end terminals of said transmission lines have an electrical length of about one-quarter wavelength at a given frequency displaced to the other side of center frequency for providing optimum bandwidth characteristics.

13. A high frequency, wide-band delay line as in claim 11 wherein said reduced periphery regions are of fine wire dimensions.

No references cited.

HERMAN KARL SAALBACH, *Primary Examiner.*